United States Patent [19]
Jäger et al.

[11] Patent Number: 5,834,548
[45] Date of Patent: Nov. 10, 1998

[54] PROCESS FOR PREPARING FINE-PARTICLE MIXTURES OF AMPHIPHILIC POLYMERS AND INORGANIC SOLIDS

[75] Inventors: Hans-Ulrich Jäger, Neustadt; Dieter Boeckh, Limburgerhof; Ulrich Bröckel, Freinsheim; Frank Müller, Ludwigshafen; Gunnar Schornick, Neuleiningen, all of Germany

[73] Assignee: BASF Aktiengesellschaft, Ludwigshafen, Germany

[21] Appl. No.: 836,205

[22] PCT Filed: Nov. 7, 1995

[86] PCT No.: PCT/EP95/04373

§ 371 Date: May 16, 1997

§ 102(e) Date: May 16, 1997

[87] PCT Pub. No.: WO96/16149

PCT Pub. Date: May 30, 1996

[30] Foreign Application Priority Data

Nov. 18, 1994 [DE] Germany ............ 44 41 189.8

[51] Int. Cl.$^6$ .................. C11D 3/37; C08G 63/20
[52] U.S. Cl. .............. 524/405; 524/417; 524/423; 524/425; 524/450; 524/599; 523/309; 523/340; 528/302; 528/308; 510/349; 252/228; 252/242
[58] Field of Search .................. 252/228, 242; 524/599, 405, 423, 425, 450, 417; 528/302, 308; 510/349; 523/309, 340

[56] References Cited

U.S. PATENT DOCUMENTS

| | | | |
|---|---|---|---|
| 3,557,039 | 1/1971 | McIntyre et al. | 510/349 |
| 4,020,015 | 4/1977 | Bevan | 510/349 |
| 5,142,020 | 8/1992 | Kud et al. | 528/272 |

FOREIGN PATENT DOCUMENTS

| | | |
|---|---|---|
| 0 272 033 A3 | 6/1988 | European Pat. Off. . |
| 0 241 985 B1 | 1/1991 | European Pat. Off. . |
| 0 185 427 B1 | 3/1992 | European Pat. Off. . |
| 0 241 984 B1 | 3/1994 | European Pat. Off. . |
| A 2249812 | 4/1973 | Germany . |
| A1 3531755 | 3/1986 | Germany . |
| 1 154 730 | 6/1969 | United Kingdom . |
| 1237899 | 6/1971 | United Kingdom . |
| WO A1 9521880 | 8/1995 | WIPO . |

OTHER PUBLICATIONS

Synthesis and NMR Study of Some Aliphatic Block and Branched α, ω–Dihydroxy Polyesterethers, A. Edelman, et al., Polymer Bulletin, 17, pp. 499–506 (1987).

World Patent Index 63–80, File 350, Dialog accession No. 002552622, WPIaccession No. 80–70647C/40, Matsushita Elec. Works: "Pulverising solid thermosetting resin condensn.prod,–in presence of powdery filler to improve dispersibility of pulverised resin in blender", JP A 55109614, 80/08/23, 8040 (Basic).

*Primary Examiner*—Andrew E. C. Merriam
*Attorney, Agent, or Firm*—Oblon, Spivak, McClelland, Maier & Neustadt, P.C.

[57] ABSTRACT

Finely divided mixtures of 97–10% by weight of at least one amphiphilic polymer whose softening point is above 35° C., and 3–90% by weight of at least one inorganic solid with a particle size not exceeding 500 $\mu$m are prepared by heating the two components to a temperature which is above the softening point of the polymer, mixing the components, dispersing the melt and rapidly cooling to a temperature at which virtually no inhomogeneity occurs and, where appropriate, further comminuting the particles at temperatures below 50° C. to a particle size of from 50 $\mu$m to 5 mm, and are used as additive to detergents.

14 Claims, No Drawings

PROCESS FOR PREPARING FINE-PARTICLE MIXTURES OF AMPHIPHILIC POLYMERS AND INORGANIC SOLIDS

BACKGROUND OF THE INVENTION

The present invention relates to a process for preparing finely divided mixtures of amphiphilic polymers and inorganic solids, and to the use of the mixtures as additive to detergents.

Description of the Background Art

Amphiphilic polymers with very different properties in the solid state are known. They can be crystalline, partly crystalline, glassy or, above the glass transition temperature, elastomeric. Amphiphilic polymers with a high degree of crystallinity are prepared for example by condensation of terephthalic acid or dimethyl terephthalate with ethylene glycol and polyethylene glycol (cf. U.S. Pat. No. 3,557,039). Such polyesters are used as detergent additive. In the washing of textile material they inhibit the redeposition of soil on the textile material; cf. GB-A-1 154 730.

EP Applications 185 427, 241 984, 241 985 and 272 033 disclose polyester condensates of polybasic aromatic carboxylic acids with dihydric alcohols and unilaterally $C_1$–$C_4$-alkyl-capped polyethers, which promote soil release from polyester fabrics. These polyesters have hydrophilic end groups which, in the applications mentioned, are said to be a prerequisite for the soil release properties of the polyesters.

Amphiphilic polyesters of aliphatic polybasic carboxylic acids and/or monohydroxymonocarboxylic acids with polyethylene glycol are described for example in Polymer Bulletin 17 (1987), 499–506.

U.S. Pat. No. 5,142,020 discloses amphiphilic polyesters obtainable by condensation of (a) carboxylic acids having at least 2 carboxyl groups, their esters, anhydrides or mixtures, (b) at least dihydric alcohols and/or addition products of from 1 to 5 mol of at least one alkylene oxide having 2 or 3 carbon atoms with 1 mol of an at least dihydric alcohol or mixtures, and (c) water-soluble addition products of from 5 to 80 mol of at least one alkylene oxide with 1 mol of $C_8$–$C_{29}$-alcohols, $C_8$–$C_{18}$-alkylphenols or $C_8$–$C_{18}$-alkylamines in a molar ratio of (a):(b):(c) of 100:(from 25 to 2500):(from 5 to 110) at temperatures of at least 120° C. to weight average molecular weights of from 2000 to 50,000. The polyesters are used as antiredeposition and soil-releasing ingredient of pulverulent and liquid detergents.

The above-described polyesters are usually incorporated into the detergent formulations in the form of aqueous solutions or dispersions. However, this use form is in many cases impractical or even unsuitable. For example, most dispersions of such amphiphilic polyesters cannot be processed in concentrations above 25% at room temperature since the viscosity is too high. In addition, processing aqueous dispersions of amphiphilic polyesters under alkaline conditions at the customary higher processing temperatures is usually likely to result in a hydrolysis and hence reduced effectiveness of the polyesters.

Prior artisans have therefore ground mixtures of amphiphilic polyesters and extrudable organic solids together in solid form, subsequently extruded the mixture, and formed the extrudate for example into granules; cf. DE-A-22 49 812. DE-A-35 31 755 discloses mixtures of amphiphilic polyesters and polycarboxylates, obtainable by mixing molten polyesters with a polyacrylate, cooling the mixture and comminuting the resulting solid product to the desired particle size by cryogenic methods. This cryogenic comminution of the material is carried out at temperatures below 0° C., sometimes even below −50° C. The coolant recommended for this purpose is liquid nitrogen or solid carbon dioxide (dry ice).

The amphiphilic polyesters in granule form hitherto described have only low mechanical stability and are subject to caking on storage. JP-A-55/109 614 discloses mixing polyester resins and fillers in the solid state in a mill. In this case, the inorganic fillers act essentially as release agents intended to prevent clogging of the mill by immediately covering the tacky surfaces of the polyester resins. The disadvantage of this process is that the release agents are deposited virtually only on the surface of the particles and therefore cannot display any shape-stabilizing effect.

OBJECTS OF THE INVENTION

It is an object of the present invention to provide a process for preparing finely divided mixtures of amphiphilic polymers and inorganic solids resulting in finely divided mixtures with an increased mechanical stability so that on storage, there is virtually no caking together of the individual particles.

SUMMARY OF THE INVENTION

We have found that this object is achieved by a process for preparing finely divided mixtures of amphiphilic polymers and inorganic solids wherein (a) 97–10% by weight of at least one amphiphilic polymer whose softening point is above 35° C., and (b) 3–90% by weight of at least one inorganic solid with an average particle size not exceeding 500 µm are heated to a temperature above the softening point of the polymer, components (a) and (b) are thoroughly mixed at this temperature, the mixture is then dispersed and rapidly cooled so that virtually no inhomogeneity occurs and, where appropriate, the mixture is subsequently comminuted to a particle size of from 50 µm to 5 mm at temperatures below 50° C.

DETAILED DESCRIPTION OF THE INVENTION

Preferably employed are completely crystalline or partly crystalline, water-dispersable, amphiphilic polymers.

The mixing temperature required as a rule for homogeneous mixing of components a) and b), for example, is above the softening point of the polymers a). This is a temperature above the glass transition temperature in the case of non-crystalline amphiphilic polymers, and is a temperature above the first maximum in the DSC (differential scanning calorimetry), at which melt processability in the chosen mixing unit is ensured, in the case of crystalline amphiphilic polymers.

The partly crystalline amphiphilic polymers are mainly polyesters. Partly crystalline means, for example, that the polymers have a degree of crystallinity of from 0.5 to 100, but preferably 20 to 90, %. Crystallinity means in this connection that a maximum appears in the DSC of the polymers and is normally assignable to a peak within a temperature range of less than 50° C. and is caused by the melting of regular part-structures in the polymer. Within one class of polymers there may be a correlation between the degree of crystallinity and the area under the peak. The polyesters employed according to the invention have, for example, a molecular weight $M_w$ of from 4000 to 60,000 and comprise as hydrophilic units polyethylene glycol, block copolymers of ethylene oxide and propylene oxide and/or butylene oxide with molecular weights $M_n$ of from 500 to 8000 and/or sulfo-containing monobasic or polybasic carboxylic acids and have as hydrophobic units condensed blocks of aromatic polybasic carboxylic acids, where appropriate combined with aliphatic polybasic carboxylic acids and $C_2$–$C_4$-alkylene glycols and/or trihydric or polyhydric alcohols.

Amphiphilic polyesters of the type mentioned are disclosed in the references mentioned at the outset, compare U.S. Pat. No. 3,557,039, EP-A-0 185 427, EP-A-0 241 984, EP-A-0 241 985, EP-A-0 272 033 and U.S. Pat. No. 5,142,020. A preferred class of partly crystalline amphiphilic polymers comprises polyesters which comprise units of (1) ethylene terephthalate and (2) polyoxyethylene terephthalate from polyethylene glycols with molecular weights $M_n$ of from 1000 to 7500 in the (1):(2) ratio of from 1:1 to 1:25 by weight.

Another class of suitable amphiphilic polymers are the polyesters disclosed in U.S. Pat. No. 5,142,020 which are obtainable by condensation of (1) carboxylic acids having at least two carboxyl groups, their esters, anhydrides or mixtures, (2) at least dihydric alcohols and/or adducts of from 1 to 5 mol of at least one alkylene oxide having 2 or 3 carbon atoms and 1 mol of an at least dihydric alcohol or mixtures and (3) water-soluble adducts of from 5 to 80 mol of at least one alkylene oxide and 1 mol of $C_8$–$C_{24}$-alcohols, $C_8$–C18-alkylphenols or $C_8$–$C_{24}$-alkylamines in the (1): (2): (3) molar ratio of from 100: (25 to 2500): (5 to 110) at temperatures of at least 120° C. up to molecular weights $M_w$ of from 4000 to 50,000.

Another class of suitable and preferred amphiphilic polymers comprises the polyesters disclosed in DE-A 44 03 866, which is not a prior publication. They comprise blocks of (1) ester units from polyalkylene glycols with a molecular weight of from 500 to 7500 and aliphatic dicarboxylic acids and/or monohydroxycarboxylic acids and (2) ester units from aromatic dicarboxylic acids and polyhydric alcohols and have molecular weights $M_w$ of from 4000 to 25,000. The ratio of ester units (1):(2) in this case is preferably from 5:1 to 1:2 by weight. Amphiphilic polyesters of this type are prepared, for example, by initial polycondensation (1) of polyalkylene glycols with a molecular weight of from 500 to 7500 with aliphatic dicarboxylic acids and/or monohydroxycarboxylic acids to prepare aliphatic polyesters, and subsequently, in the resulting aliphatic polyester, (2) preparing aromatic polyesters from aromatic dicarboxylic acids and polyhydric alcohols.

The polycondensation sequence can also be reversed, or aromatic polyesters (2) are condensed with oligomeric aliphatic polyesters (1). The ratio of the polyesters (1):(2) in the amphiphilic polyesters is from 5:1 to 1:2 by weight.

Suitable above-described polyesters are waxy to soft crystal, depending on the molecular weight, at temperatures below the softening point, which is above 25° C., preferably above 35° C. The softening point always means in the present context for partly or completely crystalline polymers the maximum heat flux in the DSC on heating up. Determination is by the DSC method (differential scanning calorimetry) with a heating rate of 2.5° C./min. The determination method is described in detail by J. F. Rabek, Experimental Methods in Polymer Chemistry, John Wiley & Sons, New York, 1980, pages 549–581. The amphiphilic polyesters which are particularly preferably employed have softening points above 45° C. They are obtainable, for example, by forming the hydrophilic part of the molecule in the preparation of the polyesters by employing polyalkylene glycols of higher molecular weight, eg. polyethylene glycols with molecular weights of at least 1500, preferably at least 2500. The resulting polyesters then preferably have molecular weights $M_w$ of at least 4000. Polyesters with softening points above 45° C. can also be prepared by employing aromatic carboxylic acids with free sulfo groups, such as sulfoisophthalic acid, in the polycondensation and, after completion of the polycondensation, neutralizing the sulfo groups with alkali metal or alkaline earth metal bases.

Apart from the polyesters described above, suitable amphiphilic polymers are those obtainable, for example, by grafting acrylic esters, methacrylic esters, vinyl acetate and/or vinyl propionate onto water-soluble polyalkylene glycols. The water-soluble polyalkylene glycols have, for example, molecular weights $M_N$ of from 2500 to 20,000, preferably 4000 to 9000, and may, where appropriate, be endgroup-capped at one or both ends. Polymers of this type are disclosed, for example, in US-A 4 846 995, U.S. Pat. No. 4,904,408, U.S. Pat. No. 4,846,994 and DE-A-3 711 299.

Other suitable amphiphilic polymers are graft copolymers obtainable by grafting (1) polycondensates based on polyesters, polyester urethanes and polyester amides with a molecular weight (number average) of, in each case, 2500 to 100,000 with (2) 0.2 to 10 parts by weight, based on one part by weight of the polycondensates, of vinyl esters, saturated $C_1$–$C_6$-carboxylic acids and/or acrylic and/or methacrylic esters of saturated, monohydric alcohols having 1 to 4 carbon atoms.

Graft copolymers of this type are disclosed, for example, in U.S. Pat. No. 4,849,126.

The amphiphilic polymers are mixed with inorganic solids. Suitable and preferred inorganic solids are those compounds which are normally used in textile detergents. Examples thereof are carbonates, sulfates, silicates, borates or phosphates of alkali metals and/or alkaline earth metals, zeolites, silica or mixtures of said compounds. Examples of suitable silicates are ion exchangers such as zeolites or sheet silicates, and amorphous silicates and precipitated silica. Inorganic solids which are preferably employed are zeolites, sodium sulfate and sodium carbonate.

The mixtures comprise 97–10, preferably 75–30, % by weight of at least one amphiphilic polymer and 3–90, preferably 25–70, % by weight of an inorganic solid. Particularly preferred mixtures comprise 70–45% by weight of the amphiphilic polymers described above under (a) and 30–55% by weight of at least one inorganic solid. The average particle size of the inorganic solids is, for example, from 1 to 500 $\mu$m and is usually in the range from 1 to 200, preferably 10 to 100, $\mu$m.

Components (a) and (b) can, for example, be initially mixed at room temperature, at which both are solids. However, it is also possible first to melt the compounds of the component (a) and add one or more compounds of group (b) and ensure thorough mixing. The inorganic solids are then present in the form of a dispersion in the softened or molten polymers. Slow cooling of mixtures of this type results in more or less pronounced inhomogeneity. To prepare the mixtures, components (a) and (b) are heated to temperatures above the softening point of the polymers, and, depending on the type of mixing unit used, it may be sufficient slightly to exceed the softening point, or distinctly higher temperatures are necessary, eg. at least 10° C. above the softening point of the polymer. Components (a) and (b) are preferably mixed at temperatures in the range from 80° to 200° C. The two components can be mixed, for example, in a vessel equipped with a stirrer or in continuous mixers, such as static mixers, which are equipped with integral mixing elements or in compulsory mixers which compel the two components (a) and (b) to mix via screws or shafts equipped with implements. The molten and homogenized mixture is then rapidly cooled to a temperature at which the viscosity of the mixture is high enough for separation to be virtually precluded. The mixture is preferably cooled in such a way that its viscosity rises in 30 sec to more than 5000 mpas, particuarly preferably to more than 50,000 mPas, at a shear rate of $0.01\ s^{-1}$. In the case of completely or partly crystalline polymers a), the mixture is preferably then cooled further to below the solidification point. This takes place, for example, by the melt being sprayed onto a cooled surface and thus granulated. The molten mixture can also be applied to a cooled belt or allowed to solidify by prilling in cooled air. It is particularly advantageous for the molten mixture to be briquetted. However, it is also possible, for example, for the molten mixture to be fed in the form of ribbons or strands onto a cooled belt and thus rapidly cooled. It is additionally possible for a thin layer to be fed over the whole area of a cooled belt. However, in the latter cases, it is necessary for the solidified melt, which is then, for example, in the form of ribbons, strands or sheets, to be comminuted to average particle sizes of from 50 $\mu$m to 5 mm. Rapid cooling of the homogeneous mixture of components (a) and (b) is an essential prerequisite for preventing inhomogeneity of the components. The solidified melt can, where appropriate, be comminuted to a particle size required in each case. After dispersion and cooling, the mixture is preferably ground in mills to average particle sizes of from 0.3 to 1.3 mm.

The finely divided mixtures of components (a) and (b) obtainable in this way have a high mechanical stability and are stable on storage at room temperature. Even after prolonged storage, they can be processed further without difficulty. The mixtures obtainable by the process according to the invention are used, for example, for producing detergents. During the washing of laundry, the polymers act as antiredeposition and soil release agents.

The mixtures of components (a) and (b) may also contain other polymers which are normally employed in detergent formulations. Examples of polymers of this type are polycarboxylates, such as partly or completely neutralized polyacrylic acids with a molecular weight of from 1000 to 130,000 and copolymers of 90–10% by weight of maleic acid and 10–90% by weight of acrylic acid or methacrylic acid, in which case the molecular weight of the copolymers is from 1000 to 100,000, preferably 40,000 to 75,000 g/mol. Also suitable are co- and terpolymers of vinyl esters with unsaturated carboxylic acids, the ester moieties of which can also be completely or partly hydrolyzed, polymaleic acids or their alkali metal salts, as other polymers. Suitable terpolymers contain 1–50 mol % of vinyl ester or vinyl alcohol units and have molecular weights of from 1000 to 100,000. Suitable polymaleates have molecular weights of from 500 to 10,000. Further suitable polymeric additives are polyaspartic acids or polyaspartimides with molecular weights of from 500 to 120,000, preferably 1000 to 50,000, or graft copolymers obtainable by grafting maleic acid and acrylic acid onto oligo- and polysaccharides, sorbitol or glucose. The graft copolymers are preferably employed in the form of the sodium salts. If another polycarboxylate is added to the mixture of components (a) and (b), the amounts of polycarboxylate are from 0.5 to 70, preferably 10 to 50, % by weight, based on components (a) and (b).

Finely divided mixtures obtainable by the process according to the invention may, where appropriate, also be dusted with from 0.1 to 5, preferably 0.5 to 2, % by weight, based on the mixtures, of a solid release agent with a particle size of from 1 to 100, preferably<10, $\mu$m. Examples of suitable release agents are organic compounds such as the salts of polycarboxylic acids, for example sodium polyacrylate, sodium citrate and sodium salts of copolymers of acrylic acid and maleic acid, and inorganic materials conventionally used as release agents, such as finely divided silica, zeolite, sodium sulfate, bentonite or talc.

If the finely divided products which are obtainable by rapid cooling of the homogenized melt, such as granules or pastilles, are subjected to a further comminution step, eg. ground, this will, of course, take place at temperatures below the softening point of the polymer, preferably at room temperature. Additional cooling of the comminuting unit may be advantageous in some cases, so that the comminution of the coarser particles which are initially obtained is carried out, for example, at temperatures in the range from −15° to 25° C.

The parts in the examples are by weight.

EXAMPLES

Polymer 1

Polyester of molecular weight $M_W$ of 8400 from polyethylene glycol of molecular weight $M_N$ of 1500 with terephthalic acid and ethylene glycol (molar ratio of ethylene terephthalate to polyethylene terephthalate 1.5:1). The polyester has a softening point of 38° C.

Polymer 2

Polyester of molecular weight $M_W$ of 10,200 from polyethylene glycol of molecular weight $M_N$ of 4000 with terephthalic acid and ethylene glycol, the molar ratio of ethylene terephthalate to polyethylene terephthalate being 5:1. The polyester has a softening point of 47° C.

Example 1

50 kg of polymer 1 are heated in a vessel equipped with a stirrer to 140° C. The polymer melt is stirred and mixed with 50 kg of sodium sulfate with an average particle size of 100 $\mu$m. As soon as a homogeneous mixture of sodium sulfate in polymer 1 is produced, the melt is discharged onto a briquetting belt. With the cooling belt at 9° C., the drops of the melt solidify to solid briquettes within 2 min. The length of the cooling belt is 5 m, and solid briquettes are present over a length of 4 m. These briquettes can be ground in a counter-rotating rotor mill without additional cooling to an average particle diameter of less than or equal to 1.3 mm. In order to increase the storage stability of the finely divided ground mixture, it can be dusted with 2% by weight of sodium sulfate with an average particle size of 5 $\mu$m. The granules resulting after dusting are stable on storage at up to 35° C.

Example 2

50 kg of polymer 2 are mixed in a vessel equipped with a stirrer with 50 kg of sodium sulfate at 140° C. as in Example 1. The melt is discharged, with continuous stirring, onto a briquetting belt. With the cooling belt at 9° C., the drops of melt solidify to solid briquettes. With a belt 5 m long, solid briquettes are present on 4 m of the belt. The briquettes are subsequently ground in a counter-rotating rotor mill without additional cooling to result in granules with an average particle diameter of 1.3 mm. The granules are stable in this form for storage at up to 35° C.

Example 3

50 kg of polymer 2 are mixed in a stirred vessel with 50 kg of ground sodium sulfate with an average particle size of 50 µm at 140° C. and briquetted as described in Example 1. The briquettes are subsequently cooled to 15° C. with liquid nitrogen and ground in a hammer mill to an average particle size of less than or equal to 1.3 mm. The resulting granules are stable on storage at up to 35° C.

Example 4

50 kg of polymer 2 are heated in a vessel equipped with a stirrer to 140° C. and mixed with 50 kg of ground sodium sulfate with an average particle size of 50 µm. The hot melt is subsequently poured in thin layers, about 1 cm thick, in shallow molds and rapidly cooled therein so that the dispersed melt solidifies. After the solidification, the resulting flat blocks are precomminuted in a hammer mill to a particle size of about 1 cm and then ground, as described in Example 3, to an average particle size below 1.3 mm by cooling with liquid nitrogen to 15° C. The resulting granules are stable on storage at up to 35° C.

The soil release effect of granules obtained in Example 1 was determined in a washing test. Table 1 contains the washing conditions. 3 prewashes were carried out. The reflectance (R1) of the test fabric was then determined. A Datacolor Elrepho 2000 instrument was used for the measurements. The test fabric was soiled with used engine oil. The reflectance (R2) of the soiled test fabric was determined again after 24 h. After another wash, the reflectance (R3) was measured. The % soil release S was calculated by the formula $$S=(R3-R2)/(R1-R2) * 100.$$

TABLE 1

| Washing conditions | |
|---|---|
| Washing machine | Launder-o-meter |
| Detergent liquor | 250 ml |
| Detergent dose | 6 g/l |
| Washing time | 30 min |
| Washing temperature | 45° C., 50° C. |
| Prewash cycles | 3 |
| Test fabric | 10 g cotton, 5 g polyester/cotton, 5 g polyester |
| Soiling | 0.2 g used engine oil on polyester |

The soil release effect of the mixture prepared as in Example 1 according to the invention was then compared with that of polymer 1. Both products were fractionated in the same way by screening in a laboratory screening machine. The fraction from 0.315 mm to 0.500 mm was used in the washing tests. Identical amounts of active polymer were employed in each of the tests, specifically 0.5% of active polymer (Table 2: A, B) and 1.0% of active polymer (Table 2: C, D). The data relate to the amount of detergent employed. The detergent used was a commercial color detergent, Persil® color from Henkel KGaA.

TABLE 2

| Soil release | | |
|---|---|---|
| S (%) | 45° C. | 50° C. |
| Without polymer | 21.9 | 24.6 |
| A 1.0% of the mixture of Example 1 | 60.2 | 75.8 |
| B 0.5% of polymer 1 | 47.0 | 68.0 |
| Without polymer | 21.9 | 24.6 |
| C 2.0% of the mixture of Example 1 | 77.6 | 82.4 |
| D 1.0% of polymer 1 | 76.7 | 82.1 |

The results in Table 2 show that soil removal (S) is improved by addition of polymer in all cases. The effect of the product obtained in the example according to the invention is distinctly greater than the effect of polymer 1. The advantages are particularly great at low polymer concentration (Table 2: A, B).

We claim:

1. A process for preparing finely divided mixture amphiphilic polymers and inorganic solid 1 wherein
   (a) 97–10% by weight of at least one amphiphilic polymer whose softening point is above 35° C., and
   (b) 3–90% by weight of at least one inorganic solid with an average particle size not exceeding 500 µm
   are heated to a temperature above the softening point of the polymer, components (a) and (b) are thoroughly mixed at this temperature, the mixture is then dispersed and rapidly cooled so that virtually no inhomogeneity occurs and, optionally, the mixture is subsequently comminuted to an average particle size of from 50 µm to 5 mm at temperatures below 50° C.

2. A process as claimed in claim 1, wherein said amphiphilic polymers are completely or partly crystalline.

3. A process as claimed in claim 1, wherein said amphiphilic polymer comprises partly crystalline polyesters having a weight average molecular weight $M_w$ of from 4,000 to 60,000 and contains as hydrophilic units polyethylene glycol, block copolymers of ethylene oxide and propylene oxide and/or butylene oxide with number average molecular weights $M_N$ of from 500 to 8,000 and/or sulfo-containing monobasic or polybasic carboxylic acids and contains as hydrophobic units, condensed blocks of aromatic polybasic carboxylic acids, optionally combined with aliphatic polybasic carboxylic acids and $C_2$–$C_4$-alkylene glycols and/or trihydric or polyhydric alcohols.

4. A process as claimed in claim 1, wherein said amphiphilic polymers are polyesters which comprise units of
   (1) ethylene terephthalate and
   (2) polyoxyethylene terephthalate from polyethylene glycols with number average molecular weights $M_n$ of from 1000 to 7500
   in the (1):(2) ratio of from 1:1 to 1:25 by weight.

5. A process as claimed in claim 1, wherein said amphiphilic polymer comprises polyesters obtained by condensation
   (1) carboxylic acids having at least two carboxyl groups, their esters, anhydrides or mixtures,
   (2) at least dihydric alcohols and/or adducts of from 1 to 5 mol of at least one alkylene oxide having 2 or a carbon atoms and 1 mol of an at least dihydric alcohol or mixtures and
   (3) water-soluble adducts of from 5 to 80 mol of at least one alkylene oxide and 1 mol of $C_8$–$C_{24}$-alcohols;

$C_8$–$C_{18}$-alkylpheriols or $C_8$–$C_{24}$-alkylamines in the (1):(2):(3) molar ratio of from 100:(25 to 2500):(5 to 110) at temperatures of at least 120° C. up to a weight average molecular weight $M_w$ of from 4000 to 50,000.

6. A process as claimed in claim 1, wherein said amphiphilic polymer comprises polyesters which comprise blocks of
   (1) ester units from polyalkylene glycols with a number average molecular weight of from 500 to 7500 and aliphatic dicarboxylic acids and/or monohydroxycarboxylic acids and
   (2) ester units from aromatic dicarboxylic acids and polyhydric alcohols and have a weight average molecular weight $M_w$ of from 4000 to 25,000.

7. A process as claimed in claim 1, wherein said inorganic solid comprises inorganic compounds normally used in textile detergents.

8. A process as claimed in claim 1, wherein said inorganic solid comprises the carbonates, sulfates, silicates, borates or phosphates of alkali metals and/or alkaline earth metals, zeolites, silica or mixtures of said compounds.

9. A process as claimed in claim 1, wherein the average particle size of said inorganic solid is from 1 μm to 500 μm.

10. A process as claimed in claim 1, wherein components (a) and (b) are mixed at from 80° to 200° C., and the mixture is rapidly cooled on a cooled belt.

11. A process as claimed in claim 1, wherein the solidified melt is comminuted to average particle sizes of from 50 μm to 5 mm.

12. A process as claimed in claim 1, wherein, after dispersion and cooling, the mixture is ground in mills to average particle sizes of from 0.3 to 1.3 mm.

13. A process as claimed in claim 1, wherein the finely divided mixtures are dusted with from 0.1 to 5% by weight, based on the mixtures, of a solid release agent with a particle size of from 1 to 100 μm.

14. A detergent which comprises an additive amount of a mixture of amphiphilic polymers and inorganic solids prepared as claimed in claim 1.

* * * * *